United States Patent
Takeuchi

(10) Patent No.: US 11,350,297 B2
(45) Date of Patent: May 31, 2022

(54) RADIO FRAME ANALYSIS SYSTEM, RADIO FRAME ANALYSIS METHOD, AND PROGRAM

(71) Applicant: NEC CORPORATION, Tokyo (JP)

(72) Inventor: Toshiki Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 38 days.

(21) Appl. No.: 17/082,782

(22) Filed: Oct. 28, 2020

(65) Prior Publication Data

US 2021/0144568 A1  May 13, 2021

(30) Foreign Application Priority Data

Nov. 8, 2019 (JP) .............................. JP2019-203289

(51) Int. Cl.
*H04W 24/08* (2009.01)
*H04W 40/24* (2009.01)

(52) U.S. Cl.
CPC ......... *H04W 24/08* (2013.01); *H04W 40/246* (2013.01)

(58) Field of Classification Search
CPC .... H04W 24/08; H04W 40/246; H04W 24/04
See application file for complete search history.

(56) References Cited

U.S. PATENT DOCUMENTS

| 10,687,333 B2* | 6/2020 | Harris | H04L 67/14 |
| 10,959,041 B1* | 3/2021 | Burcham | G06F 16/29 |
| 2014/0273941 A1* | 9/2014 | Ramprasad | H04M 15/44 |
| | | | 455/406 |

FOREIGN PATENT DOCUMENTS

| JP | 2008-510372 A | 4/2008 |
| JP | 2016-502811 A | 1/2016 |

* cited by examiner

*Primary Examiner* — Hashim S Bhatti
(74) *Attorney, Agent, or Firm* — Sughrue Mion, PLLC

(57) ABSTRACT

An appropriate time is set as an acquisition period during which a reception data sequence for extracting a frame feature value is acquired. A radio frame analysis system includes a transmission node number count unit that counts the number of transmission nodes from a reception data sequence, an acquisition period calculation unit that calculates an acquisition period based on a result of the counting by the transmission node number count unit, and a frame feature value extraction unit that extracts a frame feature value of each of the transmission nodes from the reception data sequence received in the acquisition period.

10 Claims, 16 Drawing Sheets

RADIO FRAME ANALYSIS SYSTEM, RADIO FRAME ANALYSIS METHOD, AND PROGRAM

INCORPORATION BY REFERENCE

This application is based upon and claims the benefit of priority from Japanese patent application No. 2019-203289, filed on Nov. 8, 2019, the disclosure of which is incorporated herein in its entirety by reference.

TECHNICAL FIELD

The present disclosure relates to a radio frame analysis system, a radio frame analysis method, and a program for analyzing a configuration of a network to be analyzed by analyzing a radio frame. In particular, the present disclosure relates to a method for calculating an analysis period when a radio frame is analyzed.

BACKGROUND ART

A system that analyzes a radio frame and/or traffic of a target terminal by using a radio-wave sensor, a traffic monitor, and/or the like, and thereby infers the transmitted contents (i.e., transmitted information and the like) and/or infers the configuration of a network to be analyzed has been proposed. Hereinafter, the network to be analyzed is also referred to as the target network. Note that examples of the transmitted contents include a voice call, transmission of a video image, a videophone, broadcasting, television broadcasting, satellite broadcasting, the radio, an SMS (Short Message Service), Web access, an SNS (Social Networking Service) application, use of a carrier-specific function such as iMode, a smartphone application, telemetry, a video game, an FTP (File Transfer Protocol), an SSH (Secure Shell), a Telnet, and an RDP (Remote Desktop Protocol). Further, examples of the configuration of a network include a tree type, a star type, a ring type, a mesh type, a bus type, a full connect type, and a combination thereof.

As a method for analyzing a radio frame and/or traffic, a method for extracting and analyzing a frame feature value such as an amount of transfer data per certain unit time, the number of transfer data, the number of times of transfers, a frequency of transfers (i.e., a frequency of occurrences of transfers), and a transfer time has been proposed.

Japanese Unexamined Patent Application Publication No. 2008-510372 proposes a method for extracting an amount of data and/or an amount of consumed resources for each subscriber at certain time intervals and thereby settling a service charge for the subscriber. The resources available to each subscriber vary depending on various conditions including whether or not other users are using the resources. Therefore, in the method disclosed in the aforementioned document, the service charge is determined as a function of both the amount of consumed resources and the amount of transmitted data by extracting the amount of resources as well as the amount of data for each subscriber at certain time intervals, so that the reasonable settlement and collection of the service charge can be made. In this case, the certain time (the unit time) that serves as the basis for the period during which the amount of data and the amount of resources are extracted is fixedly set (e.g., per hour, per day, or per month) according to the time for which the settlement is made, so that the desired settlement fee can be calculated from the function of both of them. However, there is a problem that when the aforementioned unit time cannot be appropriately set, an appropriate calculation result cannot be obtained and hence an appropriate settlement fee cannot be obtained.

Further, Japanese Unexamined Patent Application Publication No. 2016-502811 proposes a method for selectively determining an ad hoc network through which data is transferred to each node by counting the number of times of transfers (the hop count) in the ad hoc network and extracting it. Specifically, a synchronization message includes the count of transfers of that synchronization message. The synchronization message is not transferred at the edge node any longer. The root node that receives this message can recognize whether or not these nodes are located near the edge of the ad hoc network and can selectively scan other ad hoc networks. In this method, it is possible, by waiting a required time until the message reaches the edge node and then receiving the message, extract the correct number of times of transfers (the correct hop count) and make a desired choice. However, there is a problem that when this required time cannot be appropriately set, a message that has not reached the edge node yet may be received and hence an incorrect decision of a choice may be made.

SUMMARY

As a method for analyzing a radio frame and/or traffic, a method for extracting and analyzing a frame feature value such as an amount of transfer data per certain unit time, the number of transfer data, the number of times of transfers, a frequency of transfers, and a transfer time has been proposed. However, although it is possible to set an appropriate unit time and thereby to perform a desired analysis in a situation where the mode and the specifications of the target network, the unit time for transmission packets, and the like are known, it is difficult to perform an appropriate extraction and analysis in a situation where the mode, the specifications, the unit time for transmission packets, and the like are not known at all.

As an example, assume a case in which an analysis is performed in order to determine which transmission node is the hub station of a star-type network based on the ratio among amounts of transmission data transmitted from respective transmission nodes per unit time. In this case, when the length of the unit packet and/or the criterion for changing users are unknown, it is impossible to appropriately set the unit time for extracting an amount of transmission data transmitted from each transmission node. That is, for example, when the extraction is performed while setting the unit time to a time length roughly equivalent to the length of the unit packet, the amount of data for only one transmission node (the amount equivalent to one packet) is always transmitted in the unit time. Therefore, the ratio among amounts of transmission data transmitted from respective transmission nodes becomes either 0% or 100%. That is, a desired analysis cannot be performed. On the other hand, by increasing the unit time so as to include a plurality of packets therein, a plurality of transmission packets transmitted from a plurality of transmission nodes are included in the unit time, so that the ratio among amounts of transmission data has a statistical value (i.e., is averaged), thus making it possible to perform a desired analysis. However, it is uncertain how much the unit time should be increased. Therefore, there is a problem that if the unit time is increased too much, the time taken to obtain a result of the analysis will unnecessarily increase. That is, there is a problem that when the length of the unit packet or the criterion for changing users is uncertain, it is impossible to appropriately determine the period during which a frame feature value such as an amount of transmission data is calculated.

Therefore, an example object that an example embodiment disclosed herein is intended to achieve is, when a frame feature value is extracted and analyzed in an analysis of a radio frame or an analysis of traffic, to set an appropriate time (i.e., a necessary and sufficient time) as an acquisition period for a reception data sequence for extracting the frame feature value.

In a first example aspect, a radio frame analysis system includes:
 a transmission node number count unit configured to count the number of transmission nodes from a reception data sequence;
 an acquisition period calculation unit configured to calculate an acquisition period based on a result of the counting by the transmission node number count unit; and
 a frame feature value extraction unit configured to extract a frame feature value of each of the transmission nodes from the reception data sequence received in the acquisition period.

In a second example aspect, a radio frame analysis method includes:
 counting the number of transmission nodes from a reception data sequence;
 calculating an acquisition period based on a result of the counting; and
 extracting a frame feature value of each of the transmission nodes from the reception data sequence received in the acquisition period.

In a third example aspect, a program causes a computer to perform:
 a transmission node number count step of counting the number of transmission nodes from a reception data sequence;
 an acquisition period calculation step of calculating an acquisition period based on a result of the counting in the transmission node number count step; and
 a frame feature value extraction step of extracting a frame feature value of each of the transmission nodes from the reception data sequence received in the acquisition period.

BRIEF DESCRIPTION OF DRAWINGS

The above and other aspects, features and advantages of the present disclosure will become more apparent from the following description of certain exemplary example embodiments when taken in conjunction with the accompanying drawings, in which.

EXAMPLE EMBODIMENT

Overview of Example Embodiment

Figure 1:
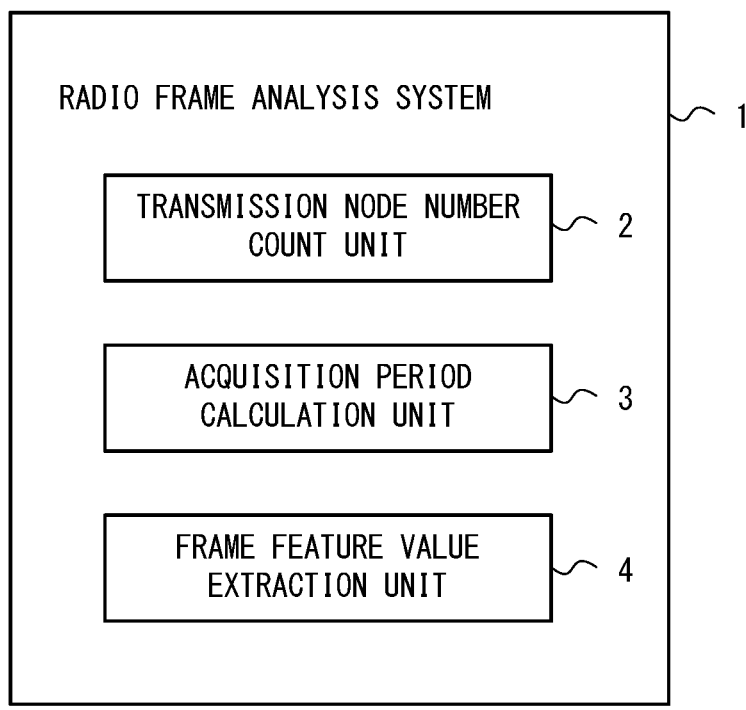
FIG. 1 is a block diagram of a radio frame analysis system according to an outline of an example embodiment.

Prior to describing an example embodiment, an overview of the example embodiment will be described. FIG. 1 is a block diagram showing an example of a configuration of a radio frame analysis system 1 according to an outline of an example embodiment. As shown in FIG. 1, the radio frame analysis system 1 includes a transmission node number count unit 2, an acquisition period calculation unit 3, and a frame feature value extraction unit 4.

The transmission node number count unit 2 counts the number of transmission nodes from a reception data sequence. The acquisition period calculation unit 3 calculates an acquisition period based on the result of the counting by the transmission node number count unit 2. The frame feature value extraction unit 4 extracts a frame feature value of each of the transmission nodes from the reception data sequence received in the acquisition period, which has been calculated by the acquisition period calculation unit 3. Note that the frame feature value is a feature value representing an aspect of transmission performed by each transmission node. Examples of the frame feature value include an amount of transmission data, a frequency of transmission, the number of times of transmission, a transmission time, an occupancy rate, the number of transmission frames, a transmission band, the number of transmission data, a transmission modulation rate, and transmission power.

According to the radio frame analysis system 1 having the above-described configuration, even when the unit time or the like for transmission packets is unknown, the acquisition period calculation unit 3 can calculate an appropriate acquisition period according to the network to be analyzed. Therefore, it is possible, when a frame feature value is extracted and analyzed in a radio frame analysis or a traffic analysis, to set an appropriate time as an acquisition period for a reception data sequence for extracting the frame feature value.

Next, an example embodiment will be described in detail with reference to FIGS. 2 to 14. In a first example embodiment, as an example of a radio frame analysis system, a basic configuration, features, and operations of a frame feature value extraction unit that extracts an amount of transmission data as a frame feature value from a reception data sequence and those of an acquisition period variable control unit that controls an acquisition period therefor will be described in detail. Further, in a second example embodiment, an example case in which the number of times of transmission and a transmission time are used as frame feature values will be described. Further, in a third example embodiment, an example case in which the position and the transmission power of each transmission node are estimated by using a plurality of radio-wave sensors, and then a radio frame is analyzed based thereon will be described.

First Example Embodiment

<Description of Configuration>

Figure 2:
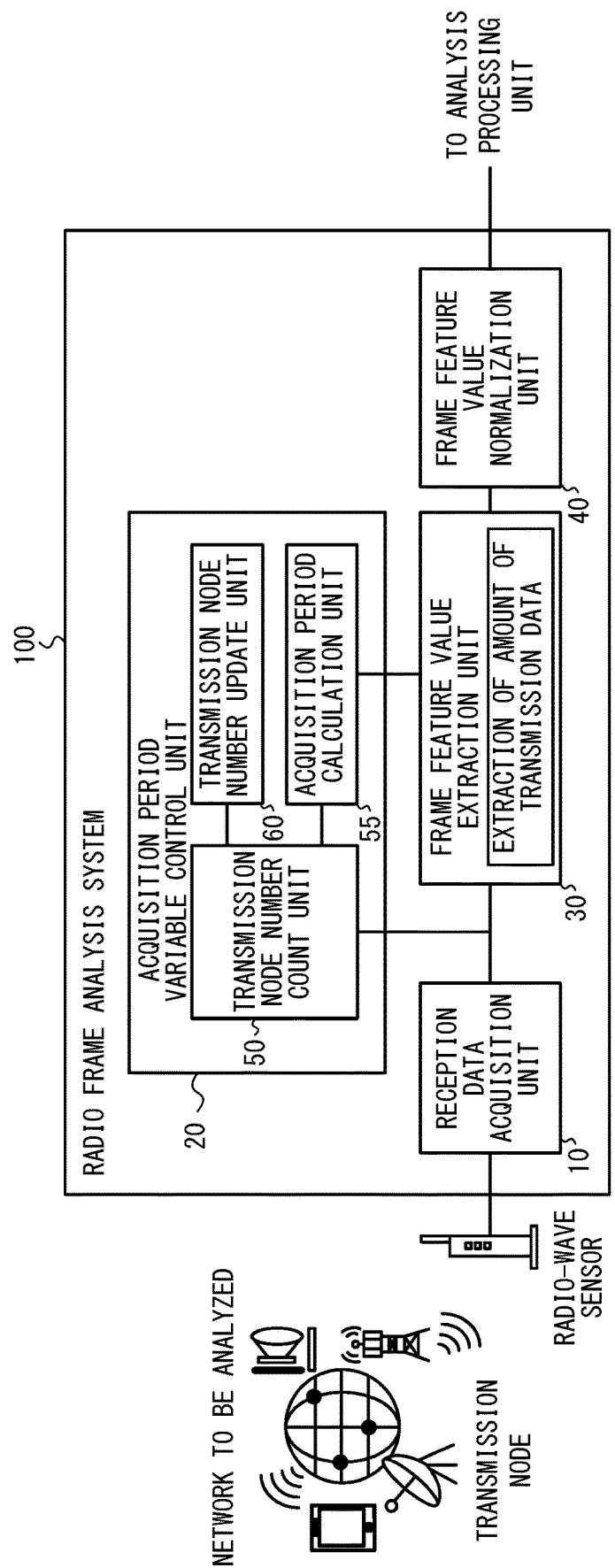
FIG. 2 shows an overall configuration of a radio frame analysis system according to a first example embodiment.

FIG. 2 shows an overall configuration of a radio frame analysis system according to a first example embodiment. As an example, this system includes a frame feature value extraction unit that extracts an amount of transmission data as a frame feature value from a reception data sequence, a normalization unit that normalizes the frame feature value, and an acquisition period variable control unit that calculates a unit period for extracting a frame feature value. They will be described hereinafter in detail.

A radio frame analysis system 100 according to the first example embodiment includes a reception data acquisition unit 10, an acquisition period variable control unit 20, a frame feature value extraction unit 30, and a frame feature value normalization unit 40. Note that the acquisition period variable control unit 20 includes a transmission node number count unit 50, an acquisition period calculation unit 55, and a transmission node number update unit 60. Note that although not shown in the drawings, the system may further include, behind (i.e., the output side of) the frame feature value normalization unit 40, an analysis processing unit that analyzes the configuration of the target network, features of each transmission node, and/or the like by using the result output from the frame feature value normalization unit 40.

The reception data acquisition unit 10 acquires, from a reception data sequence acquired by using a radio-wave sensor or the like, for example, radio frame information (such as information about a strength of a radio wave, information about a frequency band, information about a frame length, information about a used protocol, information about a transmission source, information about transmission destination, and header information) of the acquired reception data sequence. Further, the frame feature value extraction unit 30 extracts a frame feature value (such as an amount of transmission data for each transmission node) from the radio frame information of the reception data sequence according to the acquisition period specified by the acquisition period variable control unit 20. Further, the frame feature value normalization unit 40 normalizes the radio frame feature value and then outputs the normalized radio frame feature value to the analysis processing unit or the like connected therebehind.

Further, the transmission node number count unit 50 included in the acquisition period variable control unit 20 extracts transmission node information from the reception data sequence and counts the number of transmission nodes. Then, when data transmitted from transmission nodes corresponding to a "predetermined number of transmission nodes", which is set in advance, have been received, the acquisition period calculation unit 55 determines the subsequent acquisition period (i.e., the length of the subsequent acquisition period) from the time that has been taken until then and the information about the aforementioned number of transmission nodes, and transmits information about the determined acquisition period to the frame feature value extraction unit 30. Further, when the total number of transmission nodes counted by the transmission node number count unit 50 exceeds the "predetermined number of transmission nodes", the transmission node number update unit 60 updates this "predetermined number of transmission nodes" and transfers the updated number to the transmission node number count unit 50.

<Description of Operation>

Operations in the first example embodiment will be described with reference to FIGS. 2 to 6.

Figure 3:
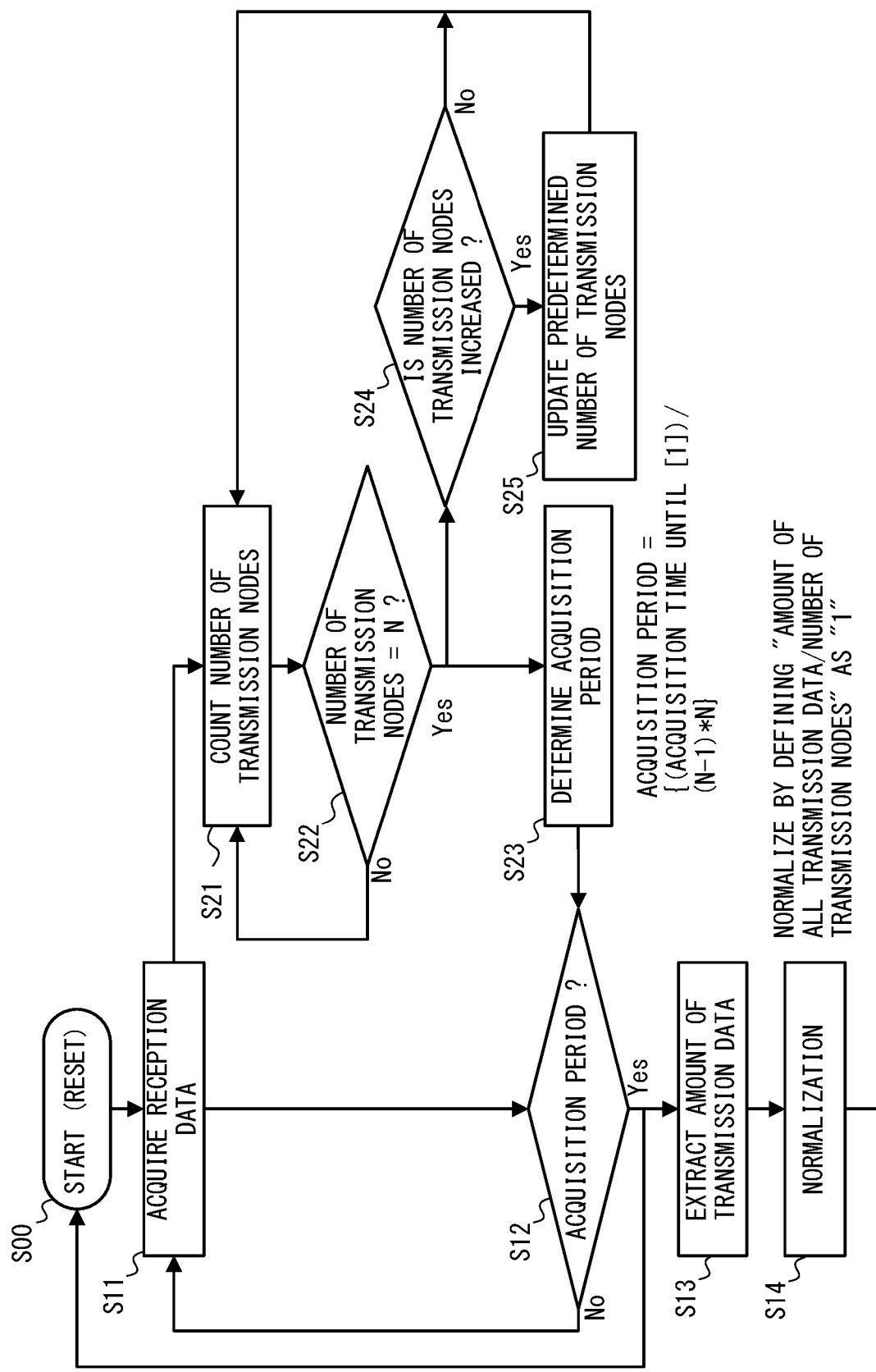
FIG. 3 shows a flow of processes performed by the radio frame analysis system according to the first example embodiment.

FIG. 3 shows a flow of processes performed by the radio frame analysis system 100 according to the first example embodiment. In the operations in the first example embodiment, firstly, the reception data acquisition unit 10 acquires, from a reception data sequence acquired by using, for example, a radio-wave sensor or the like, radio frame information of the acquired reception data sequence (S11). Note that the reception data acquisition unit 10 continues acquiring the radio frame information until the acquisition period notified from the acquisition period variable control unit 20 has expired (S12). Then, when the acquisition period has expired, the frame feature value extraction unit 30 extracts a frame feature value such as an amount of transmission data from the radio frame information acquired during the acquisition period (the reception data sequence acquired during the acquisition period) (S13). Specifically, for example, the frame feature value extraction unit 30 counts the amount of transmission data transmitted from each transmission node during the acquisition period and extracts the counted amount as a frame feature value for that transmission node. Note that examples of the frame feature value include, in addition to the amount of transmission data, feature values such as the frequency of transmission, the number of times of transmissions, a transmission time, an occupancy rate, the number of transmission frames, a transmission band, the number of transmission data, a transmission modulation rate, and transmission power.

Figure 4:
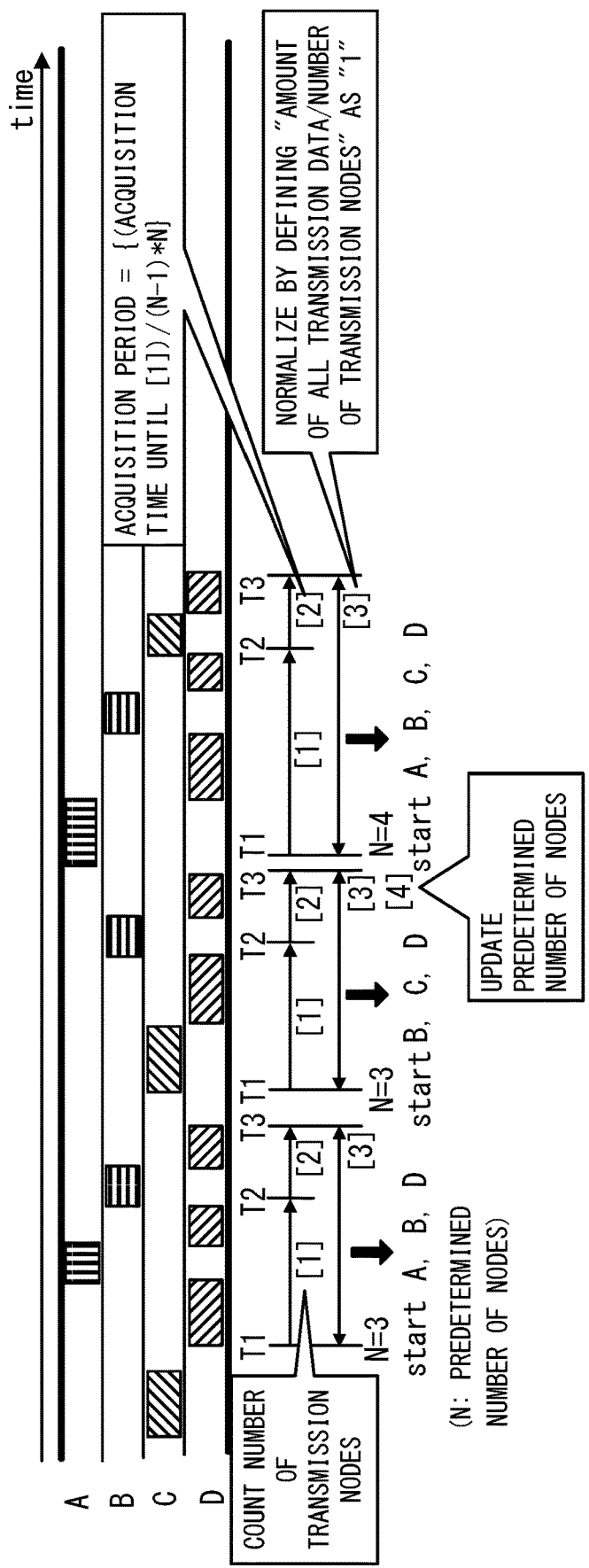
FIG. 4 shows an example of an image of processing of acquisition period variable control in the first example embodiment.

Note that the acquisition period variable control unit 20 determines the aforementioned acquisition period. FIG. 4 shows an example of an image of processes performed by the radio frame analysis system 100 according to the first example embodiment. In the acquisition period variable control unit 20, the transmission node number count unit 50 starts counting the number of transmission nodes based on the radio frame information acquired by the reception data acquisition unit 10 (S21, [1] in FIG. 4). Note that, for example, in the case of Wi-Fi (Registered Trademark), the information about the transmission node such as the MAC address may be acquired from the radio frame information. Further, the information of the transmission node may be acquired by other methods such as inferring a transmission node from the position or the transmission power of the transmission node, or identifying a transmission node from information about the signal waveform in the physical layer. Then, when the number of transmission nodes reaches a predetermined number N of transmission nodes, which is set in advance (S22), the process proceeds to a process for determining the acquisition period performed by the acquisition period calculation unit 55 (S23, [2] in FIG. 4). Note that as the predetermined number of transmission nodes N, the minimum number of nodes that is presumed according to the specifications of the network to be analyzed may be set. Alternatively, when the specifications of the network to be analyzed are unknown, the minimum number that is meaningful as a network (e.g., three) is set. In the example shown in FIG. 4, the initial value of the predetermined number N of transmission nodes is set to three (i.e., N=3). The acquisition period calculation unit 55 calculates the acquisition period for extracting a frame feature value by using an elapsed time T1_2 from a timing T1 at which the counting of the number of transmission nodes is started to a timing T2 at which the number of transmission node reaches the predetermined number N of transmission nodes (i.e., a time corresponding to the period [1] in FIG. 4), and the information about the counted number N of transmission nodes. Specifically, the acquisition period calculation unit 55 calculates the acquisition period as follows. The time T2 can be considered to be a timing at which the first data of Nth transmission node (N=M), which is the predetermined number of transmission nodes, is acquired. Therefore, the acquisition period calculation unit 55 calculates a data transmission time T2_3 corresponding to the data transmission time of one transmission node by dividing the halfway elapsed time T1_2 from the time T1 to the time T2 by a number (M−1), which is one less than the counted number (S23, [2] in FIG. 4). Then, the acquisition period calculation unit 55 defines a period that is obtained by adding the data transmission time T2_3 corresponding to the data transmission time of one transmission node to the time that has taken until the number of transmission nodes reaches the predetermined number (i.e., the halfway elapsed time T1_2) as the acquisition period for extracting a frame feature value. That is, after the number of observed transmission nodes reaches the predetermined number of transmission nodes, the acquisition period calculation unit 55 extends the period by adding the data transmission time T2_3 corresponding to the data transmission time of one transmission node, and thereby determines the acquisition period T1_3 corresponding to the data transmission time of M transmission nodes (S23, [3] in FIG. 4). Specifically, the period that is obtained by dividing the elapsed time T1_2 (the period [1]) by the number (M−1) and then multiplying it by the number M is calculated as the acquisition period T1_3 (the period [3]) (T1_3=T1_2×M/(M−1)). That is, the start timing of the acquisition period for extracting a frame feature value is the timing T1 at which the counting of the number of transmission nodes is started. Further, the end timing of the acquisition period for extracting a frame feature value is a timing at which the data transmission time T2_3 corresponding to the data transmission time of one transmission node has elapsed from the timing T2 at which the number of observed transmission nodes reaches the predetermined number of transmission nodes. Note that if the number of observed transmission nodes increases (e.g., if data is received from an (N+1)th or an (N+2)th transmission node) during the calculation of the acquisition period performed by the acquisition period calculation unit 55, the acquisition period calculation unit 55 may calculate the acquisition period as follows. That is, the acquisition period calculation unit 55 newly defines a timing at which another transmission node is observed as a timing T2 and defines the number M as the number of observed nodes (i.e., for example, M=N+1 or M=N+2). Then, the acquisition period calculation unit 55 newly calculates an acquisition period (T1_3=T1_2×M/(M−1)) (i.e., calculates the period [3]).

Then, as described above, the frame feature value extraction unit 30 extracts a frame feature value such as an amount of transmission data for each transmission node in the acquisition period calculated by the acquisition period variable control unit 20 (S13). Further, the information about the frame feature value for each transmission node output from the frame feature value extraction unit 30 is normalized by the frame feature value normalization unit 40 (S14). Then, the frame feature value normalization unit 40 outputs the normalized information to the subsequent function, such as an analysis processing unit, in which network analysis processing is performed by performing classification processing, clustering processing, or the like (S14). Then, after frame feature values in one acquisition period are extracted, the radio frame analysis processing in the next acquisition period is repeated from the reception data acquisition in parallel with the process for normalizing and outputting the normalized frame feature values (S00 and S11). At the same time, the transmission node number count unit 50 also repeats the counting of the number of transmission nodes by using the acquired reception data (the radio frame information) (S21).

The frame feature value normalization unit 40 normalizes, for example, the frame feature value in each transmission node (each_frame_feature) by converting the sum of the frame feature values (Sum_of_each_frame_feature), such as the sum of amounts of transmission data acquired from all of the transmission nodes M, into a value corresponding to the number M, i.e., the number of transmission nodes. That is, the value of the extracted frame feature value is normalized by using the number M, i.e., the number of transmission nodes. For example, when the sum of frame feature values is represented as Sum_of_each_frame_feature and the normalization is performed so that its value becomes the number M, the normalized frame feature value of each transmission node (Each_Normalized_frame feature) can be normalized as {Each_Normalized_frame_feature}=M×{each_frame_feature}/{Sum_of_each_frame_feature}. This means that, even if the number of transmission nodes is different, when the ratio among the frame feature values such as the amounts of transmission data during the acquisition period is uniform over all the transmission nodes, the normalized frame feature value of each transmission node is always normalized to a value equivalent to one and output in such a normalized state. (In the case of ({each_frame_feature}={Sum_of_each_frame_feature}/M), the relation {Each_Normalized_frame_feature=1} holds). That is, even if the acquisition period and/or the number of transmission nodes are variable, the frame feature value is always normalized to the same value unless the relation among the relative frame feature values of transmission nodes is changed. By repeatedly calculating the acquisition period by the acquisition period variable control unit 20, and continuously and repeatedly extracting and normalizing the frame feature value by the frame feature value extraction unit 30 and the frame feature value normalization unit 40, it is possible to perform a desired network analysis in the subsequent stage.

Figure 5A:
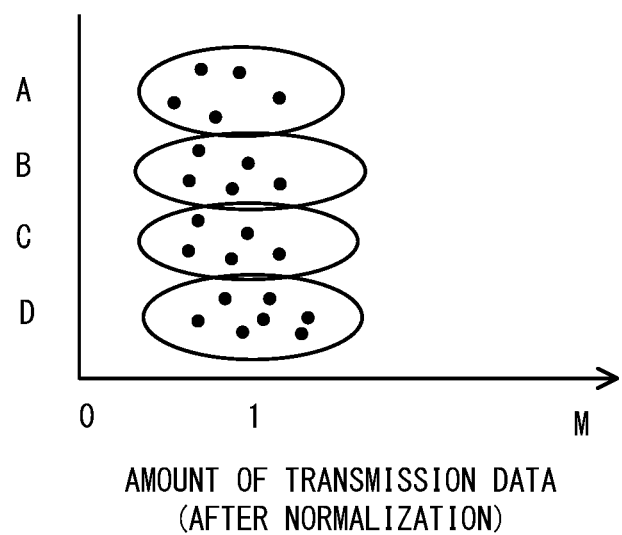
FIG. 5A shows an example of a distribution map in which frame feature values in the first example embodiment are plotted.
Figure 5B:
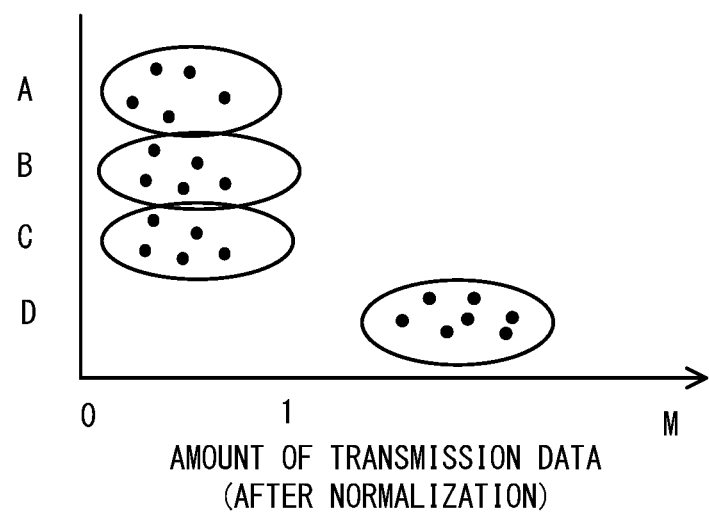
FIG. 5B shows an example of a distribution map in which frame feature values in the first example embodiment are plotted.

FIGS. 5A and 5B show examples of distribution maps (scatter diagrams) in which frame feature values are plotted for each transmission node when amounts of transmission data are used as the frame feature values. FIG. 5A shows a case where the amounts of transmission data of all the transmission nodes are substantially equal to each other. This corresponds to the case where each transmission node is a node having the same role in the target network. In contrast, FIG. 5B shows a case where there are significant differences among the amounts of transmission data of the transmission nodes. For example, there is a conceivable case in which the transmission nodes A, B and C correspond to terminal stations in a star-type network or slave stations in a tree-type network, and the transmission node D corresponds to a hub station (a control station) in the star-type network or a root node in the tree-type network. In FIG. 5A, since the amounts of transmission data transmitted from all the transmission nodes are substantially equal to each other, the amounts of transmission data in each transmission node are plotted roughly in the vicinity of a value "1" by the normalization by the frame feature value normalization unit 40 without depending on the absolute value of the acquisition period, the number of transmission nodes, the amount of transmission data, and the like. In contrast, in FIG. 5B, since the amounts of transmission data from all the transmission nodes are not equal to each other, for example, the amounts of transmission data transmitted from the transmission node D corresponding to the hub station or the root node are plotted in the vicinity of a value significantly larger than the value "1" (e.g., in the vicinity of a value (M+1)/2). Further, the amounts of transmission data transmitted from the transmission nodes A, B and C corresponding to the terminal stations and the slave stations are plotted in the vicinity of a value significantly smaller than the value "1" (e.g., a value ½). Note that in both of FIGS. 5A and 5B, the sum of the normalized amounts of transmission data (the normalized frame feature values) transmitted from all the transmission nodes is the number M, i.e., the number of transmission nodes, regardless of the absolute value of the acquisition period and the amount of transmission data.

Lastly, a transmission node number update process performed by the transmission node number update unit 60 (S24 and S25) will be described. In the example of the process shown in FIG. 4, for example, the counting of the number of transmission nodes in the first acquisition period is started with a predetermined number N of transmission nodes (N=3) and three transmission nodes D, A and B are counted in this order. Next, in the counting of the number of transmission nodes in the second acquisition period, it is started with N=3 as in the case of the first acquisition period, and three transmission nodes C, D and B are counted in this order. Note that since the three nodes A, B and D are detected in the first period and the three nodes B, C and D are detected in the second period, it is found that at least four transmission nodes A, B, C and D exist in the two acquisition periods. When the number of existing transmission nodes exceeds the predefined predetermined number of transmission nodes (N=3 in this example) as described above (S24), the transmission node number update unit 60 performs a process for updating "the predetermined number of transmission nodes" that will be set in the next and subsequent acquisition periods (S25). For example, the predetermined number of transmission nodes may be simply updated to the number of the detected transmission nodes (four in the example shown in FIG. 4), or may be updated to a value that is obtained by subtracting a predetermined number from the number of detected transmission nodes, or to a value equivalent to 80% or 70% of the number of detected transmission nodes. That is, the predetermined number of transmission nodes may be updated to a value that is obtained by reducing the number of detected transmission nodes by a predetermined ratio. However, the predetermined number of transmission nodes is updated so that the updated value is equal to or higher than the original "predetermined number of transmission nodes" (i.e., the predetermined number of transmission nodes before the update). Note that the reason why the update value does not necessarily have to be equal to the number of detected transmission nodes is as follows. That is, since the purpose of the radio frame analysis is to infer the configuration of the target network or the like, there is no need to extract the frame feature value while waiting for data transmission from all the transmission nodes including transmission nodes that do not frequently transmit data. By updating the predetermined number of transmission nodes as described above, for example, in the third acquisition period in FIG. 4, the counting of the number of transmission nodes is started with the predetermined number N of transmission nodes which has been updated to four (N=4). It is possible, by performing the above-described process for updating the number of transmission nodes, to perform an appropriate analysis according to the actual number of transmission nodes.

Figure 6:
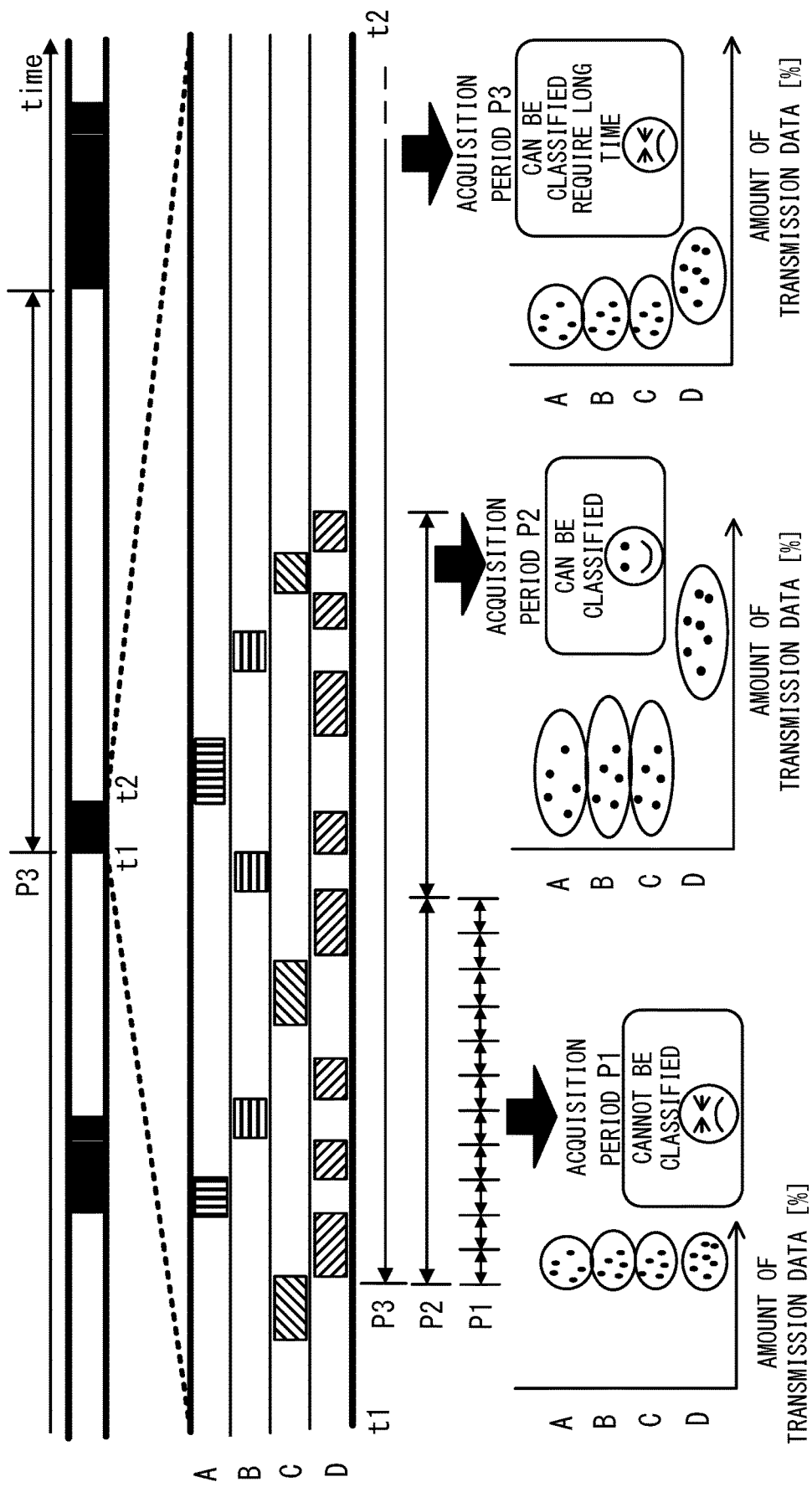
FIG. 6 is a diagram for explaining a problem and an effect of an example embodiment.

FIG. 6 is a diagram for explaining a problem and an effect of an example embodiment. Assume a situation in which the mode and the specifications of the target network and the unit time or the like for transmission packets are unknown. In this case, the unit of the time and the absolute value thereof, which indicated on the horizontal axis, are uncertain. Therefore, if the acquisition period for acquiring frame feature values for the analysis of the configuration of the network or the like is set in a fixed manner, the acquisition period may become, for example, the period P1, P2 or P3 depending on its value. Note that in the case where the acquisition period is the period P1, if the acquisition period is substantially equal to the unit transmission packet length, the amount of transmission data that can be acquired in any acquisition period P1 is the amount of transmission data equivalent to one transmission packet transmitted from any one of the transmission nodes. In this case, the deviations among amounts of transmission data, which may exist among actual transmission nodes, is not reflected, and the frame feature value, which is the amount of transmission data, is always extracted as a value in the same range. As a result, there is a problem that since the deviations among amounts of transmission data is not reflected in the plots onto the distribution map (a boxplot or a scatter diagram) or the like, a desired analysis cannot be performed.

Next, in the case where the acquisition period is the period P2, various transmission data are transmitted from respective transmission nodes during the acquisition period. Therefore, the frame feature value (the amount of transmitted data) is also extracted while reflecting the deviations among the transmission nodes. In this case, it is possible, by repeatedly extracting the frame feature value in the acquisition period P2 and plotting them on a distribution map (a boxplot or a scatter diagram) or the like, to perform a desired analysis such as classification as to which transmission node is the hub station or the root node. Lastly, in the case where the acquisition period is the period P3, it is possible to extract the frame feature value (the amount of transmitted data) while reflecting the deviations among the transmission nodes as in the case of the acquisition period P2. However, in this case, there is a problem that since the time required to extract frame feature value is longer than the time required for the period P2, a desired analysis requires a longer time. That is, in the case where the mode, the specifications, and the unit time of the target network are unknown, there is a problem that it is impossible to determine the optimum acquisition period, i.e., determine the requisite minimum acquisition period.

In contrast to this, in the radio frame analysis system 100 according to the first example embodiment, the transmission node number count unit 50 counts the number of transmission nodes until it acquires data from the predetermined number of transmission nodes, and the acquisition period calculation unit 55 calculates the subsequent acquisition period (i.e., the length of the subsequent acquisition period). In this way, it is possible to acquire desired frame feature values (such as the ratio of the amount of transmission data for each transmission node) in the unit time having a necessary and sufficient length (the requisite minimum length with which a desired analysis can be performed). That is, in the example shown in FIG. 6, there is an advantage that a requisite minimum acquisition period P2 can be obtained. This advantages leads to another advantage that a desired analysis can be performed in a requisite minimum time.

Further, it is also possible, by normalizing the acquired frame feature value in the frame feature value normalization unit 40, to extract an absolute difference of the frame feature value caused by a difference of the unit time that is set as appropriate as a relative difference necessary for a desired analysis. For example, when the acquisition period includes a period in which the transmission nodes generally do not perform communication as in the case of the acquisition period P3 in the example shown in FIG. 6, the absolute value of the frame feature value (the amount of transmission data) is smaller than that in the case where the transmission nodes transmit the frame feature value at all the times during the acquisition period. In this case, if the absolute values are plotted as they are onto the distribution map (a boxplot or a scatter diagram), the distribution of plots is deviated from one acquisition period to another and hence the accuracy of analysis deteriorates. In contrast to this, it is possible, by normalizing the frame feature value by the frame feature value normalization unit 40, to obtain plots in which only the deviations among the transmission nodes are reflected without depending on the absolute value. Further, there is a possibility that the predetermined number of transmission nodes is updated in the transmission node number update unit 60. In this case, there is also a possibility that the absolute value of the amount of transmission data changes from one acquisition period to another. However, it is possible, by normalizing the frame feature value by the frame feature value normalization unit 40, to extract them as relative values in which only the deviations among the amounts of transmission data in the transmission nodes are reflected. In this way, it is possible to improve the accuracy of the analysis by repeating the extraction of the frame feature value over a plurality of acquisition periods.

Second Example Embodiment

Figure 7:
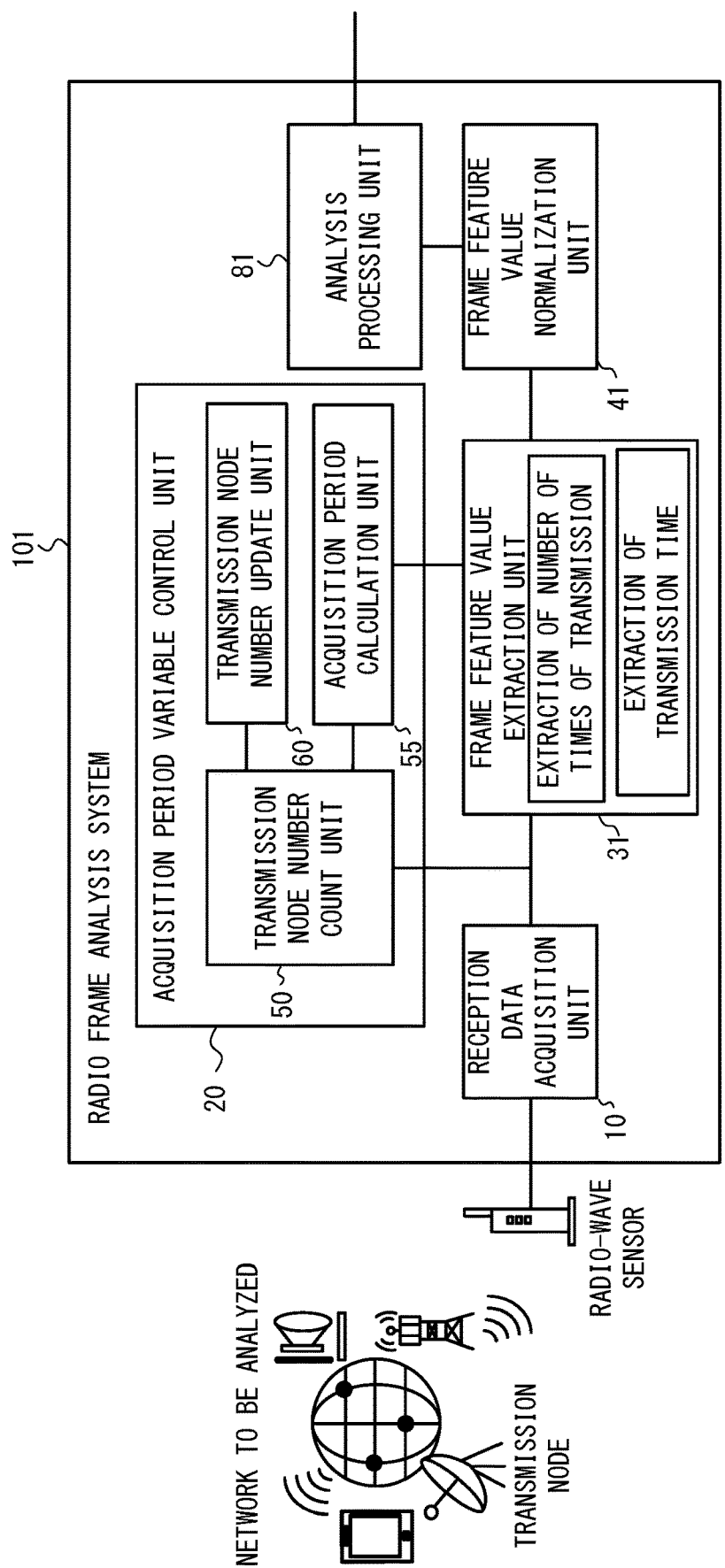
FIG. 7 shows an overall configuration of a radio frame analysis system according to a second example embodiment.

FIG. 7 shows an example of a configuration of a radio frame analysis system according to a second example embodiment. Specifically, FIG. 7 shows an example of a configuration of a radio frame analysis system 101 in the case where each of the number of times of transmission from each transmission node and a transmission time thereof is extracted as a frame feature value. Note that "the number of times of transmission" may be "the frequency of transmission" (i.e., "the frequency of occurrences of transmission"), and "the transmission time" may be "a transmission time occupancy rate".

<Description of Configuration>

Similarly to the first example embodiment, the radio frame analysis system 101 according to the second example embodiment includes a reception data acquisition unit 10, an acquisition period variable control unit 20, a frame feature value extraction unit 31, and a frame feature value normalization unit 41. Note that similarly to the first example embodiment, the acquisition period variable control unit 20 includes a transmission node number count unit 50, an acquisition period calculation unit 55, and a transmission node number update unit 60. Note that the radio frame analysis system 101 may further include, behind (i.e., the output side of) the frame feature value normalization unit 41, an analysis processing unit 81 that analyzes the configuration of the target network, the type of the transmitted content (i.e., the type of transmitted information), and/or the like by performing classification processing, clustering processing, and the like by using the result output from the frame feature value normalization unit 41.

Similarly to the first example embodiment, the reception data acquisition unit 10 acquires, from a reception data sequence acquired by using a radio-wave sensor or the like, for example, radio frame information (such as information about a strength of a radio wave, information about a frequency band, information about a frame length, information about a used protocol, information about a transmission source, information about transmission destination, and header information) of the acquired reception data sequence. Further, the frame feature value extraction unit 31 extracts a frame feature value from the radio frame information of the reception data sequence according to the acquisition period specified by the acquisition period variable control unit 20. Note that as a configuration unique to the second example embodiment, the frame feature value extraction unit 31 mainly extracts the number of times of transmission from each transmission node, the transmission time thereof, and the like. The frame feature value normalization unit 41 normalizes the number of times of transmission, the transmission time, and the like, which are the frame feature values, as in the case of the first example embodiment, and then outputs the normalized frame feature values to the analysis processing unit 81 or the like connected therebehind.

Further, since the configuration in the acquisition period variable control unit 20 is similar to that in the first example embodiment, the description thereof will be omitted.

<Description of Operation>

Operation in the second example embodiment will be described with reference to FIGS. 7 to 10.

Figure 8:
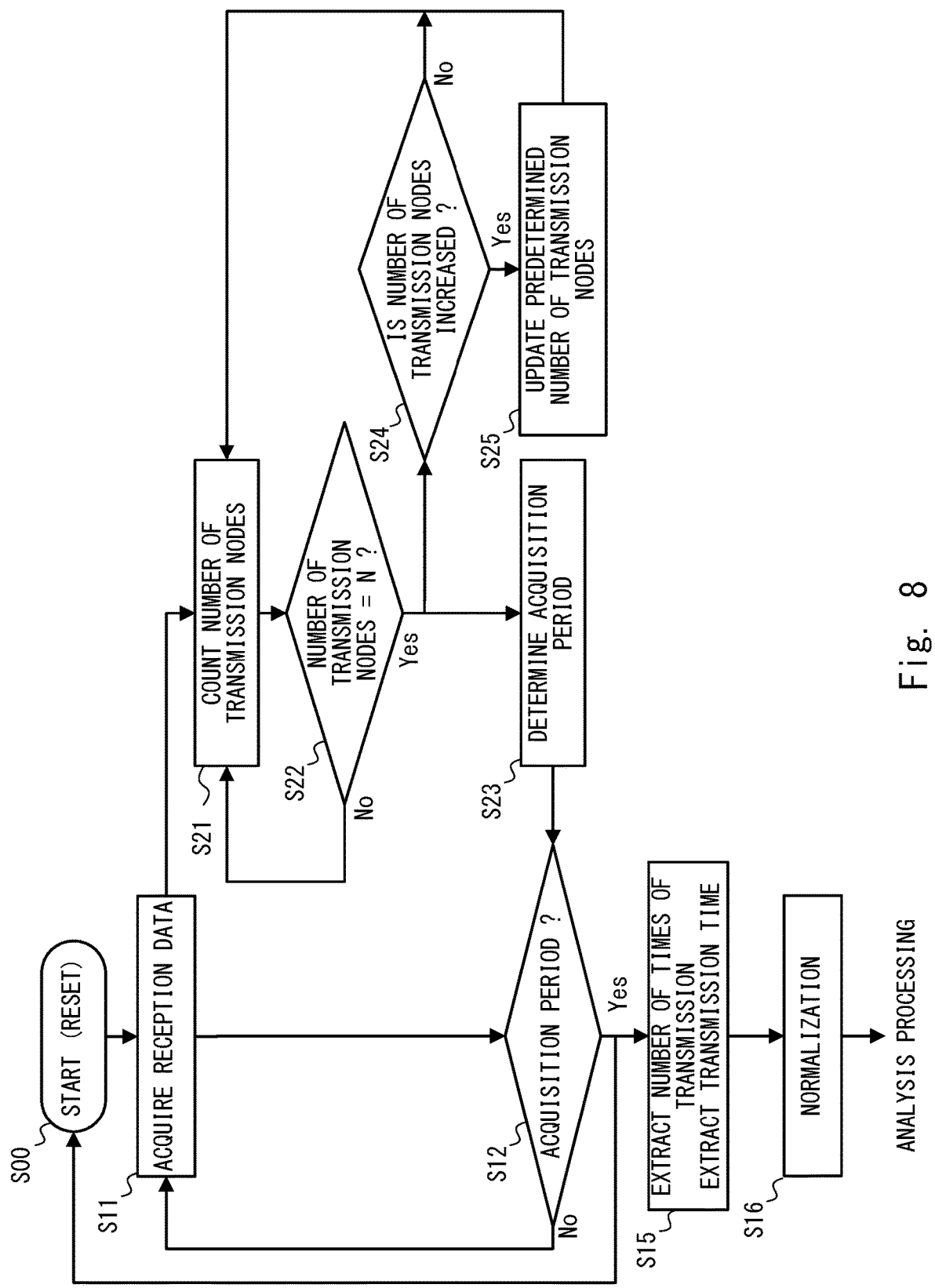
FIG. 8 shows a flow of processes performed by the radio frame analysis system according to the second example embodiment.

FIG. 8 shows a flow of processes performed by the radio frame analysis system 101 according to the second example embodiment. The process flow in the radio frame analysis system 101 is substantially the same as that in the first example embodiment. However, as a process unique to the second example embodiment, it includes the extraction of a frame feature value performed by the frame feature value extraction unit 31 (S15). The frame feature value extraction unit 31 according to the second example embodiment extracts two pieces of information, i.e., the number of times of transmission from each transmission node and a transmission time for each transmission node, as frame feature values.

Then, the frame feature value normalization unit 41 normalizes both of the frame feature values of "the number of times of transmission from each transmit node" and "the transmission time of each transmit node", and outputs the normalized values (S16). The method for normalizing each of them is similar to that in the first example embodiment. That is, the frame feature value normalization unit 41 normalizes the frame feature value for each transmission node (each_frame_feature) by converting the sum of the frame feature values (Sum_of_each_frame_feature) acquired from all of the transmission nodes M into a value corresponding to the number M, i.e., the number of all the transmission nodes. This means that, even if the number of transmission nodes is different, when the ratio among the frame feature values such as the number of times of transmission during the acquisition period and the transmission time is uniform over all the transmission nodes, the normalized frame feature value of each transmission node is always normalized to a value equivalent to one and output to the analysis processing unit 81 in such a normalized state.

Figure 9:
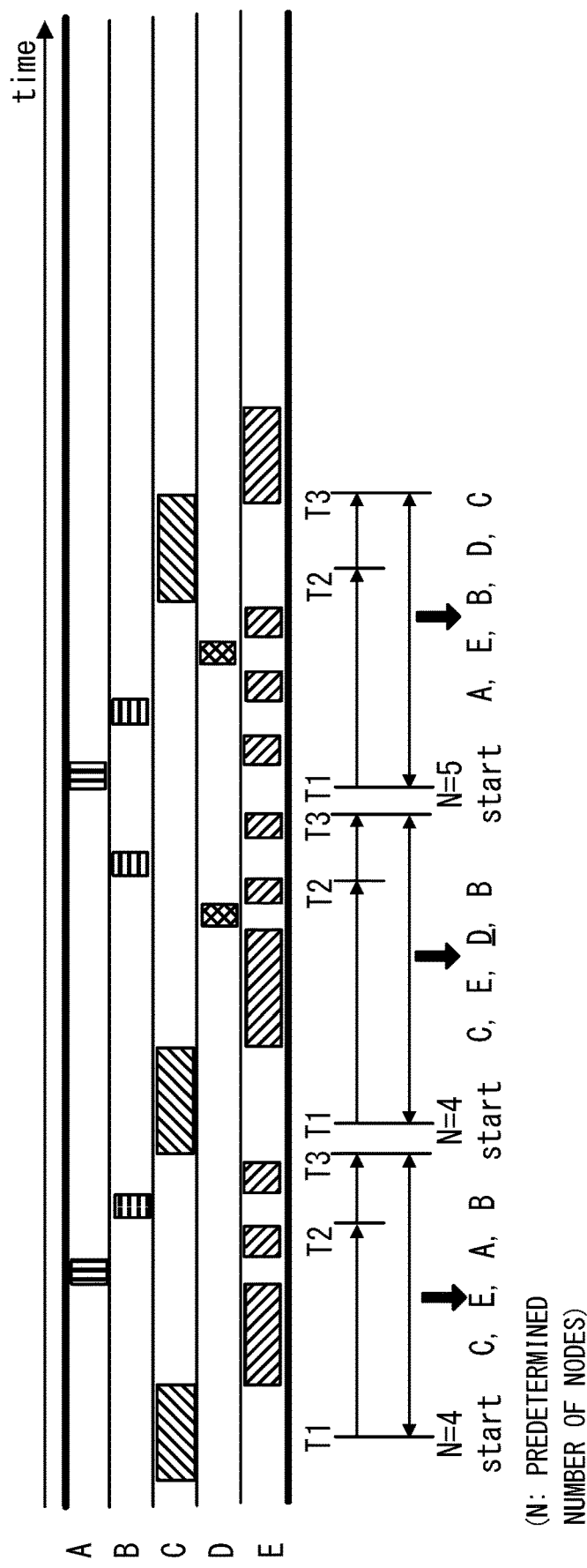
FIG. 9 shows an example of an image of processing of acquisition-period variable control in the second example embodiment.

FIG. 9 shows an image of processes performed by the radio frame analysis system 101 according to the second example embodiment. As already shown in FIG. 8, in the acquisition period variable control unit 20 according to the second example embodiment, the operations such as the transmission node number count process (S21 and S22), the acquisition period calculation process (S23), and the transmission node number update process (S24 and S25) are also basically similar to those in the first example embodiment. Note that in the example shown in FIG. 9, the predetermined number of transmission nodes that is initially set is set to four based on the assumed network to be analyzed. Therefore, in the first acquisition period, the acquisition period variable control unit 20 waits until the number of transmission nodes reaches four (in the example shown in FIG. 9, waits until data is received from the transmission nodes C, E, A and B), and then calculates the subsequent acquisition period (i.e., the length of the subsequent acquisition period) and the frame feature value extraction unit 31 extracts frame feature values (the number of times of transmission and the transmission time for each transmission node). Further, in the second acquisition period, the acquisition period variable control unit 20 also waits until the number of transmission nodes reaches four (in the example shown in FIG. 9, waits until data is received from the transmission nodes C, E, D and B), and then calculates the subsequent acquisition period (i.e., the length of the subsequent acquisition period) and the frame feature value extraction unit 31 extracts frame feature values. Since the five transmission nodes (A, B, C, D and E) are detected in total in the acquisition periods up to the second acquisition period, the transmission node number update unit 60 may update the predetermined number of transmission nodes as required. The calculation of the third acquisition period in FIG. 9 is an example in which it is performed after the predetermined number of transmission nodes is updated to five.

Figure 10A:
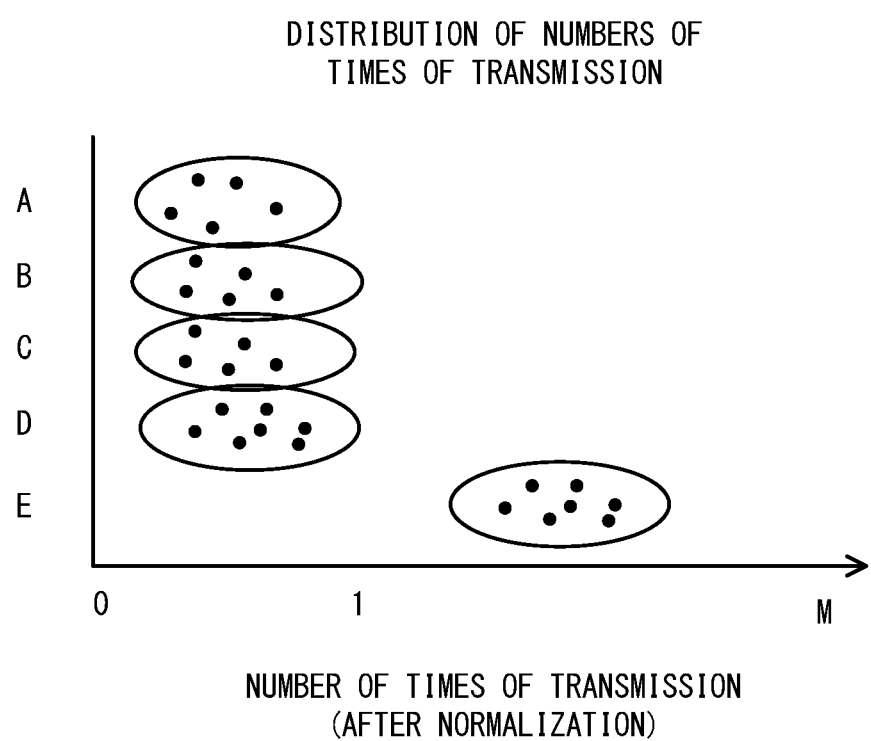
FIG. 10A shows an example of a distribution map in which frame feature values in the second example embodiment are plotted.
Figure 10B:
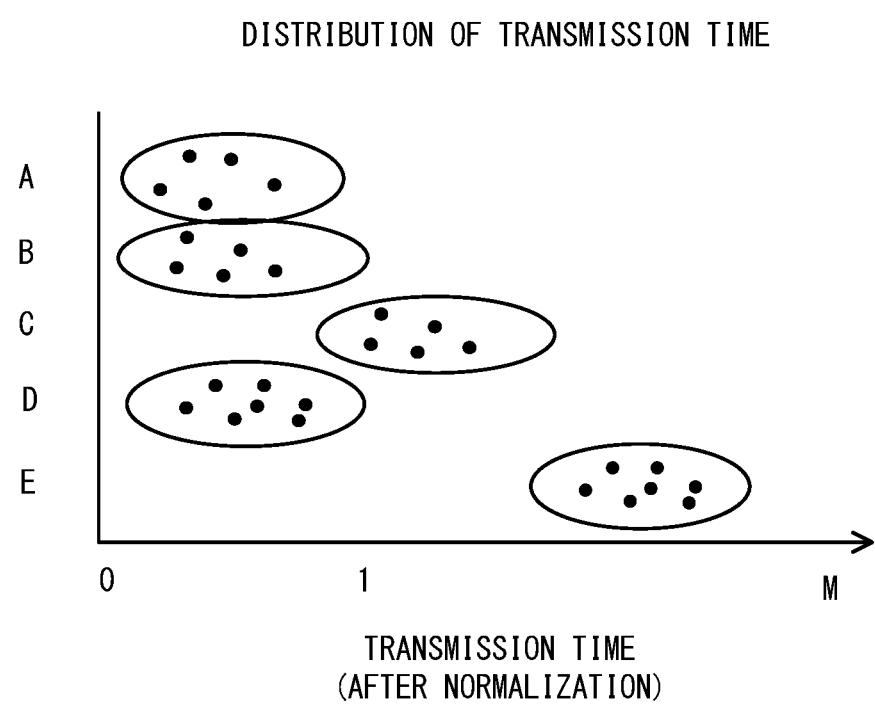
FIG. 10B shows an example of a distribution map in which frame feature values in the second example embodiment are plotted.

FIGS. 10A and 10B show examples of distribution maps (scatter diagrams) in which frame feature values for each transmission node are plotted in the case where the frame feature values are the number of times of transmission and the transmission time. FIG. 10A is an example of a distribution map in the case where the number of times of transmission is plotted as the frame feature value after it is normalized, and FIG. 10B is an example of a distribution map in the case where the transmission time is plotted as the frame feature value after it is normalized. By the calculation of the acquisition period (i.e., the length of the acquisition period) which is performed after counting the number of transmission nodes by the acquisition period variable control unit 20, it is possible to plot frame feature values while taking the relative difference, the tendency, and the relation of the transmission nodes into consideration. Further, by the normalization of each frame feature value by the frame feature value normalization unit 41, it is possible to plot frame feature values while taking only the relative relation among the transmission nodes into consideration without depending on the length of the acquisition period which can be controlled in a variable manner.

For example, FIGS. 10A and 10B show examples in which each of the number of times of transmission from each of the transmission nodes and the transmission time thereof shown in FIG. 9 is extracted, normalized, and plotted. In the example case shown in FIG. 10A in which the number of times of transmission is plotted, it can be understood that there is a meaningful difference between the distribution of the transmission node E and those of the transmission nodes A, B, C and D. From this fact, as shown in FIG. 9, it can be inferred that there is a high possibility that the transmission nodes A, B, C and D are star-type or tree-type terminal stations (slave stations), and they are transmitting data at transmission opportunities (the number of times of transmission and the frequency of transmission) roughly equivalent to each other. Further, as for the transmission node E, it can be inferred that there is a high possibility that it is transmitting data at a significantly larger number of transmission opportunities (the number of times of transmission and the frequency of transmission) than those of the transmission nodes A, B, C and D (e.g., at transmission opportunities close to the total number of transmission opportunities of the terminal stations) as in the case of the star-type hub station or the tree-type root node.

Next, in the example case shown in FIG. 10B in which the transmission time is plotted, it can be understood that there is a meaningful difference between the distribution of the transmission node C and those of the transmission nodes A, B and D, and there is also a meaningful difference from that of the transmission node E. From the relations shown in FIG. 10A and FIG. 10B, it is shown that the transmission time of the transmission node C is longer than those of the transmission nodes A, B and D, though the number of times of transmission from the transmission node C is roughly equal to those from the transmission nodes A, B and D. From this, it is inferred that, for example, the amount of data and the packet length in transmission at one transmission opportunity in the transmission node C are larger and longer than those in the transmission nodes A, B and D. As a result, for example, it can be inferred that the transmission node C is likely to be a node that transmits continuous data (or data having a relatively long payload length) such as a voice and a video image. Further, it can be inferred that the transmission nodes A, B and D are likely to be nodes that transmit control data (data having a relatively short payload length) such as that for Web access and a control command.

As described above, in the radio frame analysis system 101 according to the second example embodiment, a plurality of frame feature values such as a transmission opportunity (the number of times of transmission and the frequency of transmission) and a transmission time (a transmission time occupancy rate) are extracted in each acquisition period calculated by the acquisition period variable control unit 20. In this way, the analysis processing unit 81, which is disposed at the subsequent stage, can perform various analyses such as the inference of the transmitted content transmitted from each transmission node during the analysis time as well as the configuration of the target network. For example, as described above, an example of the analysis of the configuration of the target network is an analysis as to whether each transmission node corresponds to a star-type or tree-type terminal station or a slave station, or to a hub station or a root node. Further, an example of the inference of the transmitted content is an analysis as to whether the content transmitted from each transmission node is continuous data such as a voice or a video image, or is a control data packet. Further, in addition to the above-described examples, it is possible to carry out various analyses by combining various types of information such as the amount of transfer data, the number of transfer data, the number of times of transfers, the frequency of transfers, the transfer time, and the transfer rate as frame feature values.

Third Example Embodiment

Figure 11:
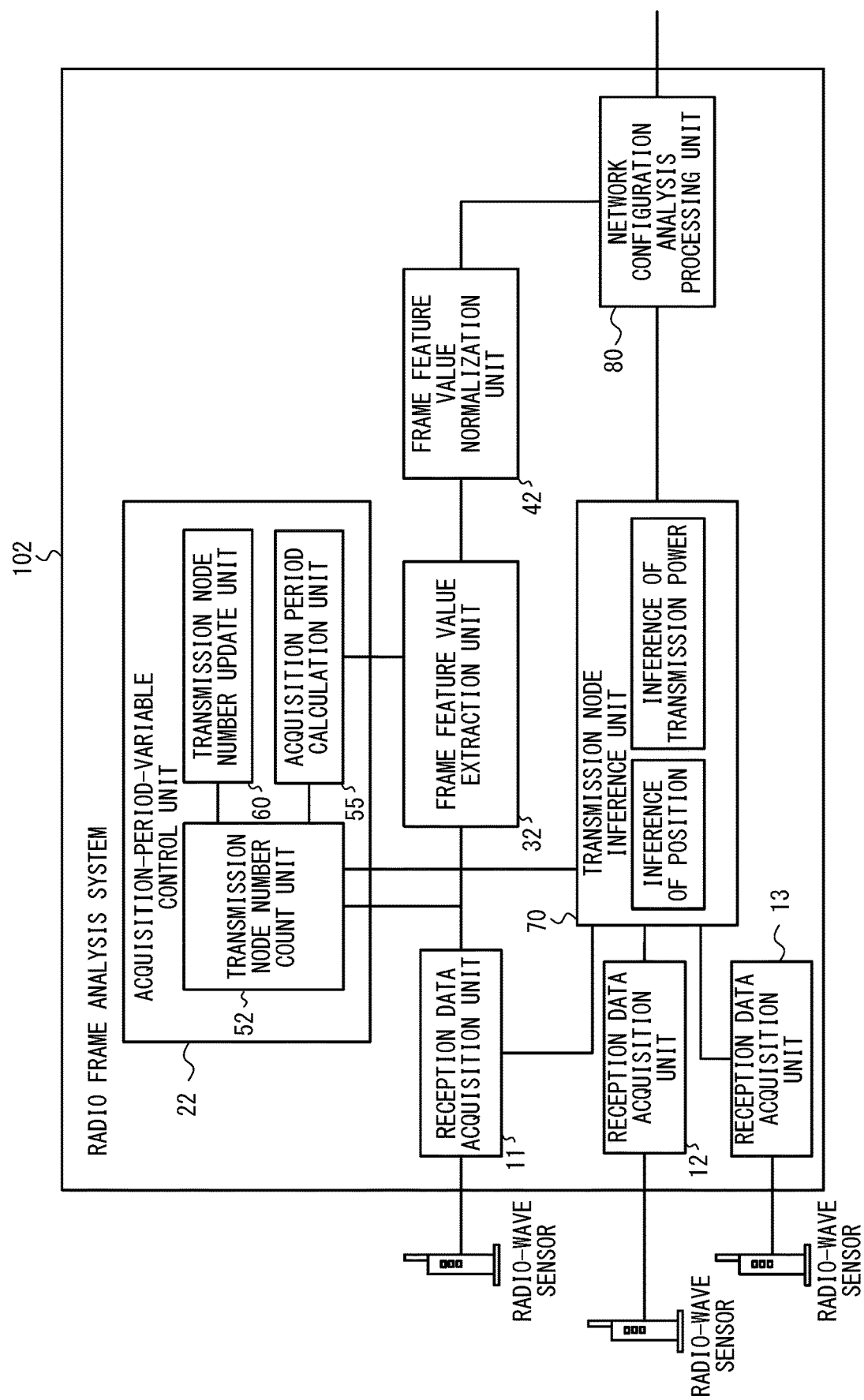
FIG. 11 shows an overall configuration of a radio frame analysis system according to a third example embodiment.

FIG. 11 shows, as an example of a radio frame analysis system according to a third example embodiment, an example case in which the position or the transmission power of each transmission node is estimated (or inferred) by using a plurality of radio-wave sensors, and then a radio frame is analyzed based thereon.

<Description of Configuration>

Similarly to the first example embodiment, a radio frame analysis system 102 according to the third example embodiment includes a reception data acquisition unit 11, an acquisition period variable control unit 22, a frame feature value extraction unit 32, and a frame feature value normalization unit 42. Note that, similarly to the first example embodiment, the acquisition period variable control unit 22 includes a transmission node number count unit 52, an acquisition period calculation unit 55, and a transmission node number update unit 60. Note that the radio frame analysis system 102 may further include, behind (i.e., the output side of) the frame feature value normalization unit 42, a network configuration analysis processing unit 80 that analyzes the configuration of the target network, the type of the transmitted content, the feature of each transmission node, and/or the like by performing classification processing, clustering processing, and the like by using the result output from the frame feature value normalization unit 42.

Similarly to the first example embodiment, the reception data acquisition unit 11 acquires, from a reception data sequence acquired by using a radio-wave sensor or the like, for example, radio frame information of the acquired reception data sequence. Further, the frame feature value extraction unit 32 extracts a frame feature value from the radio frame information of the reception data sequence according to the acquisition period specified by the acquisition period variable control unit 20. The frame feature value normalization unit 42 performs normalization as in the case of the above-described example embodiment.

Note that as a configuration unique to the third example embodiment, the radio frame analysis system 102 includes a plurality of reception data acquisition units 11, 12 and 13 which acquire reception data sequences from a plurality of respective radio-wave sensors disposed in a plurality of places. Note that although three radio-wave sensors and three reception data acquisition units are show in the example shown in FIG. 11, the number of these components is not limited to three. Further, the reception data acquisition units 11, 12 and 13 may be physically located inside the radio frame analysis system 102, or may be located in the respective radio-wave sensors. Further, the radio frame analysis system 102 includes a transmission node inference unit 70. The transmission node inference unit 70 receives received radio-wave strength information (received power information), which is one of the radio frame information pieces acquired by the reception data acquisition units 11, 12 and 13, and estimates (or infers) the transmission position from which the reception data signal was transmitted and the transmission power thereof.

Further, since the configuration in the acquisition period variable control unit 22 is similar to that in the first example embodiment, the description thereof will be omitted. However, as a configuration unique to the third example embodiment, in order to acquire transmission node information that indicates from which transmission node each received data is transmitted, the transmission node number count unit 52 may use transmission node information sent from the transmission node inference unit 70.

Lastly, similarly to the first and second example embodiments, the network configuration analysis processing unit 80 uses, as a configuration unique to the third example embodiment, not only the information about each of the normalized frame feature values but also information about estimated transmission power of each transmission node estimated by the transmission node inference unit 70. That is, the network configuration analysis processing unit 80 analyzes the configuration of the target network, the type of the transmitted content, the feature of each transmission node, and the like by using the aforementioned information items.

<Description of Operation>

Figure 12:
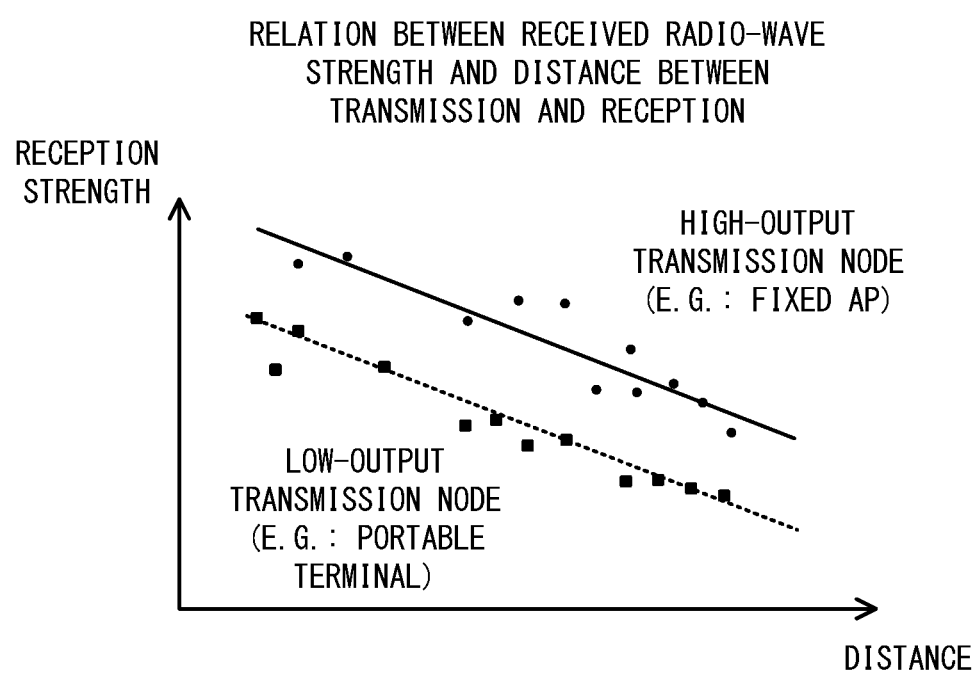
FIG. 12 is a graph showing an example of a relation between strengths of received radio waves and distances between transmission nodes and reception nodes.
Figure 13:
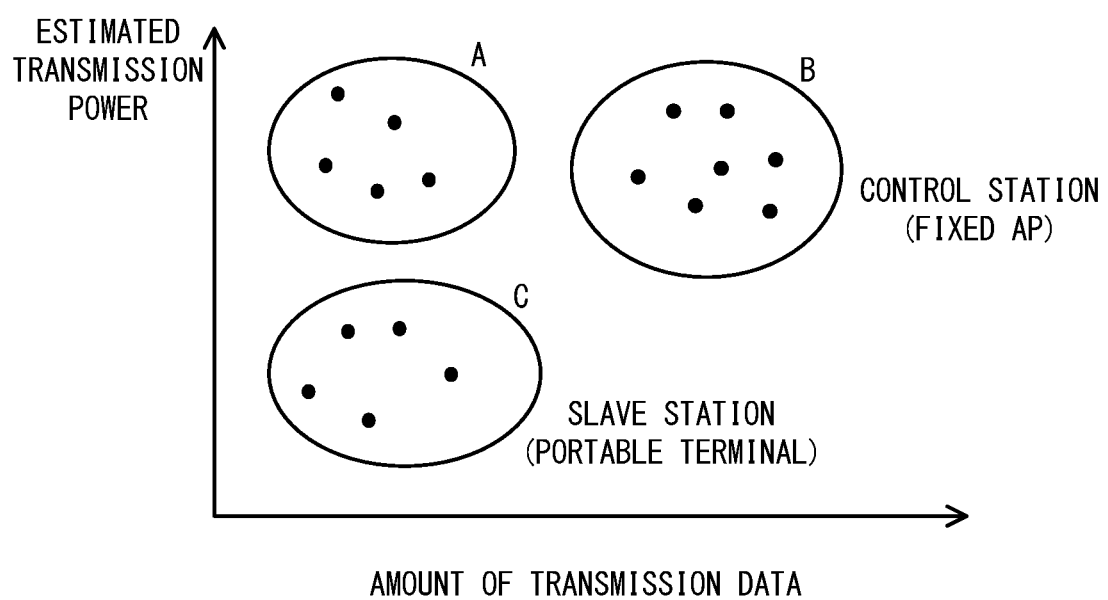
FIG. 13 shows an example of a scatter diagram using frame feature values in the third example embodiment.

Operations in the third example embodiment will be described with reference to FIGS. 11 to 13.

Operations performed by the radio frame analysis system 102 are substantially similar to those in the first and second example embodiments. However, as an operation unique to the third example embodiment, the plurality of reception data acquisition units 11, 12 and 13 acquire received radio-wave strength information (received power information) from reception data sequences received by a plurality of radio-wave sensors corresponding thereto. Then, they send the information about the received radio wave strengths to the transmission node inference unit 70, and the transmission node inference unit 70 estimates (or infers) the position and the transmission power of the transmission node by using the plurality of information pieces about the received radio-wave strengths (the received power) received by the respective radio-wave sensors arranged in a distributed manner.

For example, in this example embodiment, the transmission power and the transmission position are estimated (or inferred) by using a propagation model represented by the below-shown expression (hereinafter referred to as the Expression 1).

$$\tilde{m}_n(\varphi) = \alpha \cdot d_n(\varphi)^{-\beta}$$

$$d_n(\varphi) = \sqrt{(x-x_{n1})^2+(y-x_{n2})^2+(z-x_{n3})^2} \quad \text{[Expression 1]}$$

In the Expression 1, $\tilde{m}_n(\varphi)$ is a received radio-wave strength at a radio-wave sensor n. Further, in general, a propagation constant α in the Expression 1 is a parameter related to the transmission output of the radio wave, and β is a parameter related to an attenuation rate at a unit distance. Further, $d_n(\varphi)$ is a distance between the radio-wave sensor n and a transmission node, and φ=(x, y, z) is coordinates of the position of the transmission node. Further, $(x_{n1}, x_{n2}, x_{n3})$ is coordinates of the position of the radio-wave sensor n. In an environment where the radio-wave sensors are arranged, by receiving a radio wave transmitted from a transmission node whose transmission position and transmission power are known in advance by each of the radio-wave sensors, a graph shown in FIG. 12 can be obtained. FIG. 12 is a graph in which the propagation model represented by the Expression 1 is used as an example, and relations between received radio-wave strengths and distances between the transmission node and the radio-wave sensors when a radio wave transmitted from the known transmission node is received by the radio-wave sensors are plotted. Note that in the example shown in FIG. 12, they are plotted for two types of transmission nodes having different transmission power, i.e., a high-output transmission node (ex.: a fixed AP (Access Point)) and a low-output transmission node (ex.: a mobile terminal). Further, each of the propagation constants (α and β) is obtained by fitting received radio-wave strengths which are measured in advance and distances between the transmission node and the radio-wave sensors into the Expression 1 by using a least squares method, a maximum likelihood estimation method, or the like. Note that it is expected that when the propagation environment is the same, the constant β related to the attenuation rate has the same value and the difference in the transmission power of the transmission node is expressed as the constant α.

Further, in the position estimation process performed by the transmission node inference unit 70, based on the information about the reception strength received at each of the radio-wave sensors, the distance from each of the radio-wave sensors to the transmission node is estimated by using the Expression 1, which includes these propagation constants (α, β), and then the position of the transmission node is estimated. Note that when the transmission power at each transmission node is known, the propagation constant α corresponding to the transmission node having this transmission power is estimated from the value of the propagation constant α of each of the high-output transmission node and the low-output transmission node estimated in advance, and then the position of the transmission node is estimated. On the other hand, when the transmission power in each transmission node is unknown, the transmission position is estimated by using several candidate values as the propagation constant α. Then, the estimated position where the reliability (the joint likelihood that distances from the plurality of sensors converge at one point) of the position estimation becomes the highest and the transmission power corresponding to the propagation constant α in that state are output as the position of the transmission node and the estimated transmission power thereof, respectively. Note that for the position estimation and the transmission power estimation performed by the transmission node inference unit 70, in addition to the aforementioned method, a technique in which the propagation constants α and β and the transmission position are collectively estimated and updated in real time by using a particle filter or the like may be used.

As described above, the transmission node inference unit 70 may estimate the position and the transmission power of the transmission node from the reception data sequence, output the estimated position and transmission power as the transmission node position information, and use the estimated position and transmission power when the number of transmission nodes is counted by the acquisition period variable control unit 22. That is, similarly to the first example embodiment, for example, in the case of Wi-Fi, the transmission node number count unit 52 may obtain the transmission node by acquiring a MAC address from the radio frame information, or may identify the transmission node from the transmission position and the transmission power input from the transmission node inference unit 70.

Further, in the third example embodiment, operations performed by the acquisition period variable control unit 22, and operations performed by the frame feature value extraction unit 32, the frame feature value normalization unit 42, and the like are similar to those in the first and second example embodiments, and therefore the description thereof will be omitted.

As an operation unique to the third example embodiment, the network configuration analysis processing unit 80 uses not only the information about the normalized frame feature values as in the first and second example embodiments, but also the information about the transmission position and the transmission power estimated by the transmission node inference unit 70. That is, the network configuration analysis processing unit 80 analyzes the configuration of the network and/or each of the transmission nodes by using these information items. FIG. 13 is a scatter diagram in which relations between estimated transmission power and frame feature values such as amounts of transmission data are plotted for each transmission node. The network configuration analysis processing unit 80 analyzes the configuration of the target network and the specifications of each transmission node by performing classification processing and clustering processing based on this scatter diagram. For example, from the example shown in FIG. 13, it can be inferred that the transmission node B having a large amount of transmission data and large transmission power is likely to be a star-type or tree-type control station (a hub station) and likely to be a fixed AP or a vehicle-mounted station having large transmission power. On the other hand, it can be inferred that the transmission node C having a small amount of transmission data and small transmission power is likely to be a slave station and likely to be a portable terminal station carried by a person.

As described above, as an effect of the third example embodiment, it is possible to infer information about the transmission node from a reception data sequence by estimating (or inferring) the transmission position and the transmission power by the transmission node inference unit 70 by using information such as received radio-wave strengths received by a plurality of radio-wave sensors arranged in a distributed manner. As a result, there is an advantage that the transmission node number count unit 52 can count the number of transmission nodes even when they are unknown network nodes of which transmission node information cannot be acquired from the frame information (of which information such as a MAC address of Wi-Fi or the like cannot be obtained). Further, similarly, by using the information about the transmission position and the transmission power estimated (or inferred) by the transmission node inference unit 70, the network configuration analysis processing unit 80 can also analyze the specifications (whether it is a fixed-AP-type vehicle-mounted station, a portable-type terminal station, or the like) of each transmission node.

<Configuration of Computer>

Figure 14:
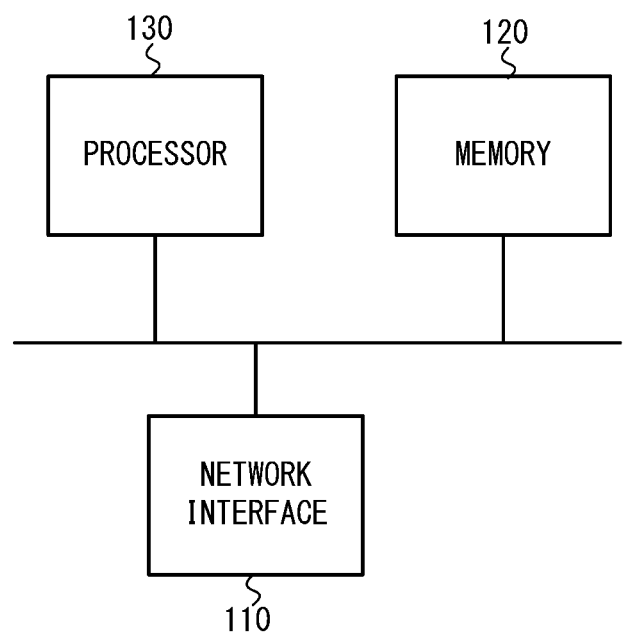
FIG. 14 is a block diagram showing a configuration of a computer of a radio frame analysis system according to each example embodiment.

FIG. 14 is a block diagram showing a configuration of a computer of each of the radio frame analysis systems 100, 101 and 102 according to the above-described example embodiments. As shown in FIG. 14, each of the radio frame analysis systems 100, 101 and 102 includes, for example, a network interface 110, a memory 120, and a processor 130.

The network interface 110 is used to perform communication with an external entity. The network interface 110 may include, for example, a network interface card (NIC).

The memory 120 is formed by, for example, a combination of a volatile memory and a nonvolatile memory. The memory 120 is used to store software (a computer program) including at least one instruction executed by the processor 130 and store data used for various types of processing.

The aforementioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memories (CD-ROM), CD-R, CD-R/W, and semiconductor memories (such as mask ROM, Programmable ROM (PROM), Erasable PROM (EPROM), flash ROM, and Random Access Memory (RAM)). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers, or a wireless communication line.

The processor 130 loads the software (the computer program) from the memory 120 and executes the loaded software, and thereby performs the processing of the radio frame analysis systems 100, 101 and 102 according to the above-described example embodiments. That is, the processing of the radio frame analysis systems 100, 101 and 102 may be implemented by executing the program. Note that part or all of the processing of the radio frame analysis systems 100, 101 and 102 may be implemented by a hardware circuit or the like. The processor 130 may be, for example, a microprocessor, an MPU (Micro Processor Unit), or a CPU (Central Processing Unit). The processor 130 may include a plurality of processors.

Effect of Example Embodiment

As described above, according to the above-described example embodiment, the following effects can be expected.

A first effect is that even when a unit time such as the length of a unit packet of a target network is unknown, it is possible to extract a frame feature value such as an amount of transmission data in a requisite minimum acquisition period, and thereby to efficiently analyze the configuration of the network. The reason for this is that, in the above-described radio frame analysis system, it is possible to acquire a desired frame feature value (such as a ratio of an amount of transmission data for each transmission node) in a unit time having a necessary and sufficient length (a requisite minimum length with which a desired analysis can be performed) by performing counting, by the transmission node number count unit, until data is transmitted from a predetermined number of transmission nodes and calculating, by the acquisition period calculation unit, the subsequent acquisition period (i.e., the length of the subsequent acquisition period). Further, by normalizing the acquired frame feature value by the frame feature value normalization unit, it is also possible to extract an absolute difference of frame feature values caused by a difference in the unit time which is set variously as a relative difference necessary for a desired analysis.

A second effect is that it is possible to reduce the time required to analyze the configuration of the target network and the specifications of each transmission node (i.e., to increase the speed of the analysis). In the above-described radio frame analysis system, as already described as the first effect, the transmission node number count unit performs counting until data is transmitted from a predetermined number of transmission nodes, and the acquisition period calculation unit calculates the subsequent acquisition period (i.e., the length of the subsequent acquisition period). In this way, it is possible to acquire a desired frame feature value in a unit time having a necessary and sufficient length. This means that, as already shown in the second example embodiment, even if the frame feature value to be acquired, the length of the unit packet of the target network, the transmitted content, and the like are different, the acquisition period (i.e., the length of the acquisition period) can be optimized to a necessary and sufficient length according to these factors. That is, as compared to the case where the acquisition period is set while taking the worst case into consideration based on information about the frame feature value to be acquired and the specifications of the target network in advance (ex.: the acquisition period P3 in FIG. 6), it is possible to acquire the frame feature value in the optimum acquisition period which has been reduced to a necessary and sufficient length (ex.: the acquisition period P2 in FIG. 6). Therefore, as described above, it is possible to reduce the time required to analyze the configuration of the target network and the specifications of each transmission node (i.e., to increase the speed of the analysis).

A third effect is that by combining a plurality of frame feature values and analyzing them in a combined state, it is possible to perform various analyses such as an analysis of the content transmitted from each transmission node as well as the configuration of the target network. This is because, as already described in the second example embodiment, for example, by extracting and analyzing two or more types of feature values such as the number of times of transmission and the transmission time as frame feature values, it is possible to acquire the below-shown information from the relation between these frame feature values. That is, it is possible to acquire, for example, information, such as the transmission time and the amount of transmission data at one transmission opportunity, that leads to (i.e., enables) the inference of the transmitted content (such as control information and data information). Further, these effects are ones that can be achieved because, by the optimization of the acquisition period by the acquisition period variable control unit, a plurality of frame feature values can be extracted and analyzed in a necessary and sufficient acquisition period.

Further, as a similar secondary effect, there is an advantage that, by combining with the transmission power estimation using reception strength information, it is possible to analyze the configuration of the target network while including the inference of the type (such as a vehicle-mounted type and a portable type) of each transmission node in the analysis. The reason for this is as follows. As described in the third example embodiment, the transmission position and the transmission power are estimated (or inferred) by the transmission node estimation unit by using information about received radio-wave strengths or the like received by a plurality of radio-wave sensors arranged in a distributed manner. Further, by using transmission node information (the transmission position and the transmission power) estimated (or inferred) by the transmission node inference unit, the network configuration analysis processing unit can also analyze the specifications (whether it is a fixed-AP-type vehicle-mounted station, a portable-type terminal station, or the like) of each transmission node.

The present disclosure is not limited to the above-described example embodiments, and they may be modified as appropriate without departing from the spirit and scope of the disclosure.

The whole or part of the example embodiments disclosed above can be described as, but not limited to, the following supplementary notes.

(Supplementary Note 1)

A radio frame analysis system comprising:
   transmission node number count means for counting the number of transmission nodes from a reception data sequence;
   acquisition period calculation means for calculating an acquisition period based on a result of the counting by the transmission node number count means; and frame feature value extraction means for extracting a frame feature value of each of the transmission nodes from the reception data sequence received in the acquisition period.

(Supplementary Note 2)

The radio frame analysis system described in Supplementary note 1, further comprising frame feature value normalization means for normalizing the frame feature value extracted for each of the transmission nodes.

(Supplementary Note 3)

The radio frame analysis system described in Supplementary note 2, wherein the frame feature value normalization means normalizes the frame feature value by using a value obtained by dividing a sum total of frame feature values for all transmission nodes extracted during the acquisition period by the number of transmission nodes as a reference value.

(Supplementary Note 4)

The radio frame analysis system described in any one of Supplementary notes 1 to 3, wherein the frame feature value includes one or more of an amount of a transmission data, a frequency of transmission, the number of times of transmission, a transmission time, an occupancy rate, the number of transmission frames, a transmission band, a transmission modulation rate, and transmission power.

(Supplementary Note 5)

The radio frame analysis system described in any one of Supplementary notes 1 to 4, further comprising analysis processing means for, by using the frame feature value extracted for each of the transmission nodes, making an inference about a configuration of a target network including the transmission node.

(Supplementary Note 6)

The radio frame analysis system described in any one of Supplementary notes 1 to 5, further comprising transmission power estimation means for, by using a plurality of reception sensors, estimating transmission power of each of the transmission nodes from information about reception strengths of reception data sequences acquired by the plurality of reception sensors, respectively.

(Supplementary Note 7)

The radio frame analysis system described in Supplementary note 6 dependent on Supplementary note 5, wherein the analysis processing means performs an analysis by using information of transmission power estimated for each of the transmission nodes.

(Supplementary Note 8)

The radio frame analysis system described in any one of Supplementary notes 1 to 7, further comprising position estimation means for, by using a plurality of reception sensors, estimating a transmission position of each of the transmission nodes from information about reception strengths of reception data sequences acquired by the plurality of reception sensors, respectively.

(Supplementary Note 9)

A radio frame analysis method comprising:
counting the number of transmission nodes from a reception data sequence;
calculating an acquisition period based on a result of the counting; and
extracting a frame feature value of each of the transmission nodes from the reception data sequence received in the acquisition period.

(Supplementary Note 10)

A non-transitory computer readable medium storing a program for causing a computer to perform:

a transmission node number count step of counting the number of transmission nodes from a reception data sequence;
an acquisition period calculation step of calculating an acquisition period based on a result of the counting in the transmission node number count step; and
a frame feature value extraction step of extracting a frame feature value of each of the transmission nodes from the reception data sequence received in the acquisition period.

According to the present disclosure, it is possible to provide a radio frame analysis system, a radio frame analysis method, and a program capable of setting an appropriate time as an acquisition period during which a reception data sequence for extracting a frame feature value is acquired.

The first to third embodiments can be combined as desirable by one of ordinary skill in the art.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A radio frame analysis system comprising:
at least one memory storing program instructions; and
at least one processor configured to execute the instructions to:
count the number of transmission nodes from a reception data sequence;
calculate an acquisition period based on a result of the counting; and
extract a frame feature value of each of the transmission nodes from the reception data sequence received in the acquisition period.

2. The radio frame analysis system according to claim 1, the processor is further configured to execute the instructions to normalize the frame feature value extracted for each of the transmission nodes.

3. The radio frame analysis system according to claim 2, wherein the processor is further configured to execute the instructions to normalize the frame feature value by using a value obtained by dividing a sum total of frame feature values for all transmission nodes extracted during the acquisition period by the number of transmission nodes as a reference value.

4. The radio frame analysis system according to claim 1, wherein the frame feature value includes one or more of an amount of a transmission data, a frequency of transmission, the number of times of transmission, a transmission time, an occupancy rate, the number of transmission frames, a transmission band, a transmission modulation rate, and transmission power.

5. The radio frame analysis system according to claim 1, the processor is further configured to execute the instructions to, by using the frame feature value extracted for each of the transmission nodes, make an inference about a configuration of a target network including the transmission node.

6. The radio frame analysis system according to claim 1, the processor is further configured to execute the instructions to, by using a plurality of reception sensors, estimate transmission power of each of the transmission nodes from information about reception strengths of reception data sequences acquired by the plurality of reception sensors, respectively.

7. The radio frame analysis system according to claim 5, the processor is further configured to execute the instructions to, by using a plurality of reception sensors, estimate transmission power of each of the transmission nodes from information about reception strengths of reception data sequences acquired by the plurality of reception sensors, respectively, and perform an analysis by using information of transmission power estimated for each of the transmission nodes.

8. The radio frame analysis system according to claim 1, the processor is further configured to execute the instructions to, by using a plurality of reception sensors, estimate a transmission position of each of the transmission nodes from information about reception strengths of reception data sequences acquired by the plurality of reception sensors, respectively.

9. A radio frame analysis method comprising:
- counting the number of transmission nodes from a reception data sequence;
- calculating an acquisition period based on a result of the counting; and
- extracting a frame feature value of each of the transmission nodes from the reception data sequence received in the acquisition period.

10. A non-transitory computer readable medium storing a program for causing a computer to perform:
- a transmission node number count step of counting the number of transmission nodes from a reception data sequence;
- an acquisition period calculation step of calculating an acquisition period based on a result of the counting in the transmission node number count step; and
- a frame feature value extraction step of extracting a frame feature value of each of the transmission nodes from the reception data sequence received in the acquisition period.

* * * * *